W. L. & A. DRAKE.
EGG CABINET FOR INCUBATORS.
APPLICATION FILED JULY 13, 1912.
1,051,710.  Patented Jan. 28, 1913.
3 SHEETS—SHEET 1.
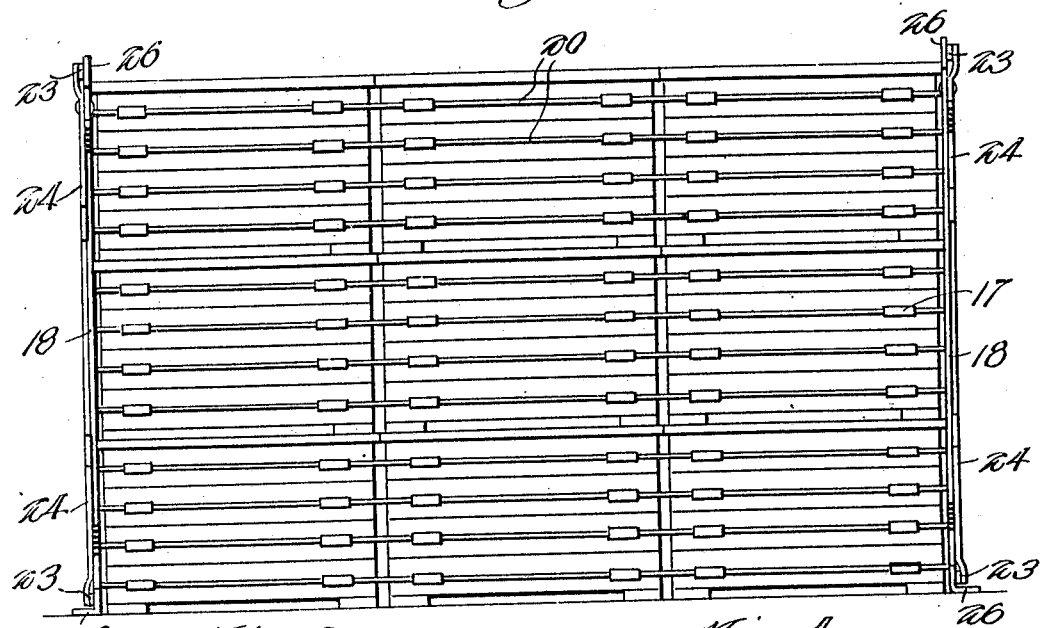
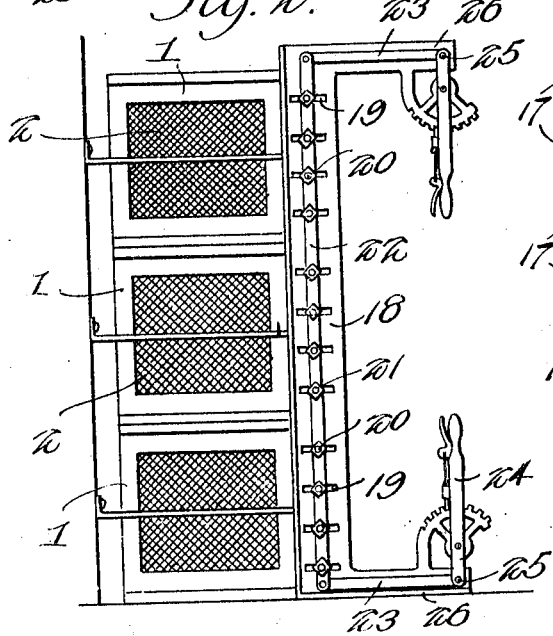
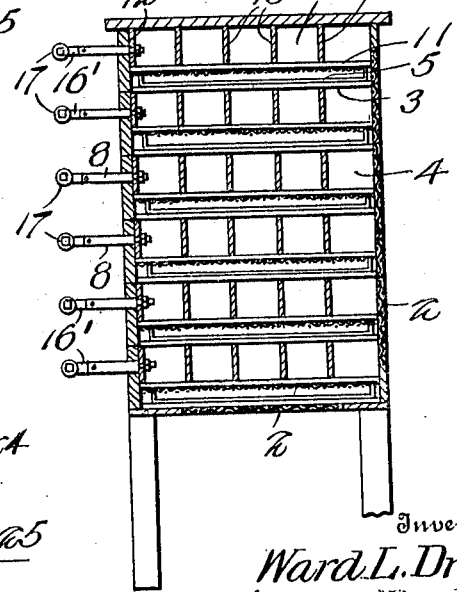
Witnesses
Inventors
Ward L. Drake
Anna Drake
By Victor J. Evans
Attorney

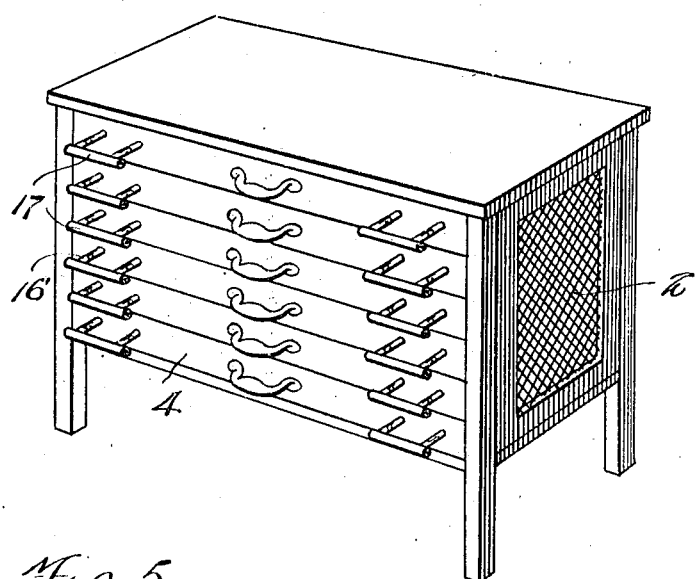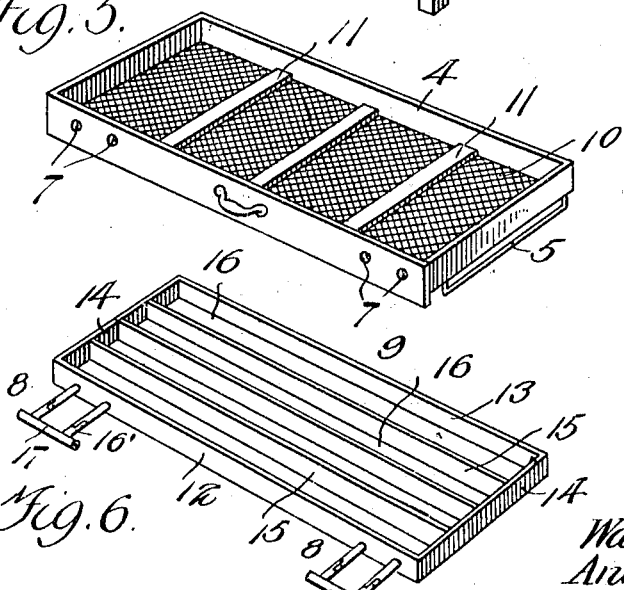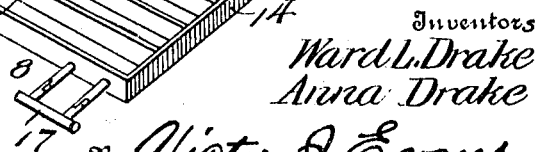

W. L. & A. DRAKE.
EGG CABINET FOR INCUBATORS.
APPLICATION FILED JULY 13, 1912.
1,051,710.
Patented Jan. 28, 1913.
3 SHEETS—SHEET 3.
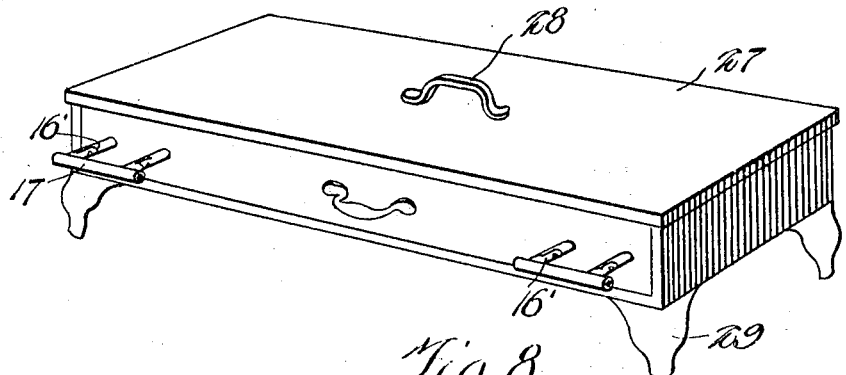
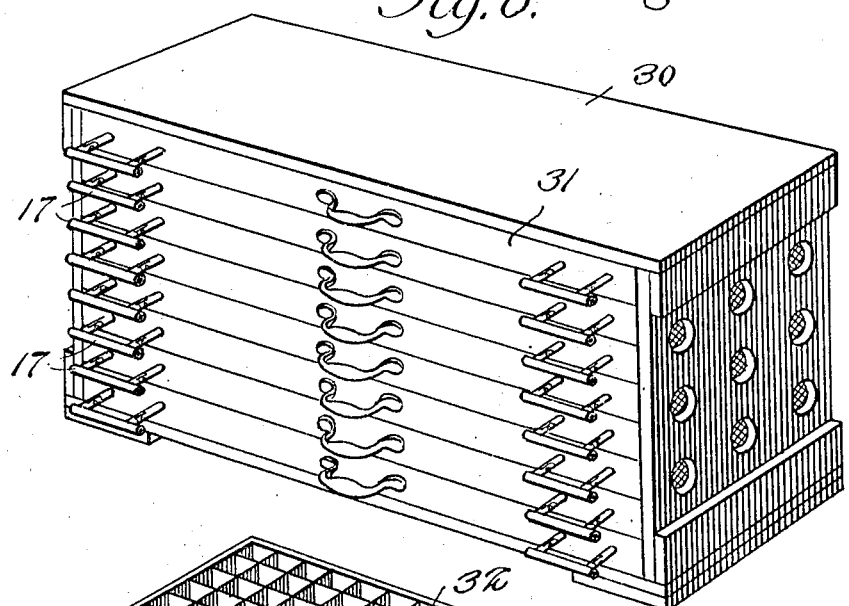
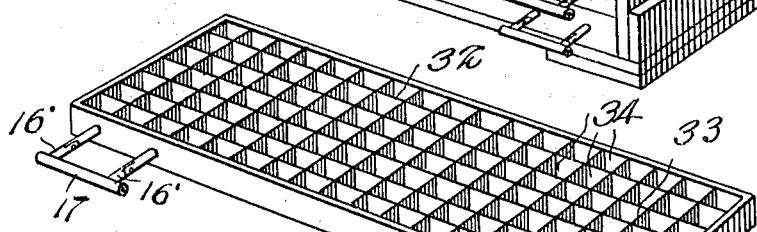
Witnesses
Inventors
Ward L. Drake
Anna Drake
By Victor J. Evans
Attorney

UNITED STATES PATENT OFFICE.

WARD L. DRAKE AND ANNA DRAKE, OF REDFIELD, SOUTH DAKOTA.

EGG-CABINET FOR INCUBATORS.

1,051,710.　　　　Specification of Letters Patent.　　Patented Jan. 28, 1913.

Application filed July 13, 1912. Serial No. 709,149.

*To all whom it may concern:*

Be it known that we, WARD L. DRAKE and ANNA DRAKE, citizens of the United States, residing at Redfield, in the county of Spink and State of South Dakota, have invented new and useful Improvements in Egg-Cabinets for Incubators, of which the following is a specification.

This invention relates to egg cabinets for incubators or storage purposes, and has for an object to provide a cabinet wherein means will be employed for turning eggs in a natural manner for the purpose of preventing a settling of the yolks and the closing of the pores of the egg, whereby the normal condition of the eggs is maintained so that eggs of maximum fertility can be safely relied upon.

Another object of the invention is to provide a cabinet which will include a plurality of egg trays which will each be provided with an actuating member for rolling or turning the eggs, the said member, in effect, forming such a part of the tray that will permit of its removal with the tray when desired.

A still further object of the invention is to provide compact operating means for moving the actuating members on the trays, the said mechanism being so constructed that a battery or large series of cabinets can be connected therewith for the simultaneous operation of all of the egg actuating members.

In the drawings, forming a portion of this specification and in which like numerals of reference indicate similar parts in the several views:—Figure 1 is a front view of the apparatus. Fig. 2 is a side view thereof.
Fig. 3 is a perspective view of a slightly modified form of apparatus. Fig. 4 is a vertical section therethrough. Fig. 5 is a perspective view of one of the drawers. Fig. 6 is a perspective view of the rolling device. Figs. 7 and 8 represent further modifications of the apparatus. Fig. 9 is a perspective view of the rolling device shown in Fig. 8.

A plurality of tiers of superimposed cabinets 1 is shown in Fig. 1 of the drawings and as illustrated each cabinet 1 is of rectangular configuration being provided with the foraminous walls 2 whereby the cabinet can be thoroughly ventilated. Each cabinet has mounted therein at its sides horizontally disposed cleats 3 on which the drawers 4 are slidably mounted, the said drawers being provided at their ends with rails 5 which are adapted to freely slide on the cleats. At the front, each drawer is provided with a plurality of pairs of horizontal passages 7 through which the inner portions of the handles 8 extend. These handles are carried by the front walls of the rolling members or agitating devices 9. The drawers 4 are provided with the foraminous bottoms 10 which are strengthened or reinforced by the transverse brace bars 11 which connect the front and back portions of the drawers together. The agitating or rolling members 9 are of rectangular configuration and each is provided with the spaced longitudinal bars 12 and 13, the connecting end bars 14 and the intermediate spaced slats 15. The slats are sufficiently spaced apart and from the longitudinal bars 13 and 14 so that each drawer is provided with a plurality of cells 16. The drawers exceed in width the width of the agitating or rolling members whereby the latter can be freely reciprocated in the former. The agitating members are bottomless whereby when eggs are placed in the cells they will rest upon the foraminous bottoms of the drawers. This construction is such that when the agitating members are reciprocated the eggs will be turned or rolled upon the bottoms of the drawers so as to prevent the settling of the yolks of the eggs against their shells with the resultant elimination of the closing of the pores of the shell, thus maintaining the normal condition of the eggs and permitting of the storage of eggs for a considerable duration of time with the insurance of maximum fertility.

The handles of the agitating members are provided with hingedly mounted outer portions 16' having the hollow cylindrical like manipulating members 17.

It is desired in view of the showing in Fig. 1 that the cabinets are preferably arranged in companion tiers and in view therefore the cabinets of one tier are in line with the cabinets of the adjacent tier, therefore, substantially superimposed rows of cabinets are presented with their said cylindrical manipulating members 17 in line. Now, in view of the arrangement of such plurality of cabinets it is obvious that they are adapted in their entirety for the storage of a large quantity of eggs and in view thereof apparatus such as shown in Figs. 1 and 2 of the drawings is employed whereby the agitating members of all of the drawers can be simultaneously operated. This apparatus comprises vertical standards 18 which are provided with superimposed elongated slots 19 through which the ends of the actuating rods 20 are extended. These rods are removably fitted as at 21 to the vertical reciprocating rods 22 which are connected by the links 23, to the actuating levers 24. These levers are pivoted at 25 to the extensions 26 on the standards 18 and they are adapted to be rocked manually, or otherwise so that the rods 22 will be simultaneously reciprocated to cause all of the agitating members to move at one time.

In the form of the apparatus shown in Fig. 7 the cabinet 27 is one of portable construction which is designed for small storage purposes and adapted to be readily carried from place to place, the said cabinet, being preferably provided with a handle 28 and the supporting feet 29.

The cabinet 30 shown in Fig. 8 is one designed for small storage purposes but it is provided with a plurality of drawers 31 whose agitating members may be singly reciprocated. The agitating members for each drawer of the cabinet shown in Fig. 8 is provided with the longitudinal partitions 32 and the transverse partitions 33 which are relatively associated, as shown so as to provide the intervening cells 34 therebetween. This cabinet may be used for general shipment of eggs for market purposes and the agitating members may be constructed of cardboard or the like so that they can be replaced when worn by new members at a minimum cost.

We claim:—

1. Storage apparatus for eggs comprising a cabinet, having an egg supporting drawer slidably mounted therein, an egg agitating device slidably mounted within the drawer, the front wall of the drawer being provided with spaced pairs of openings, and handle members for said agitating device including inner rod members slidably mounted within the drawer openings and outer rocking members pivotally attached thereto.

2. Storage apparatus for eggs comprising a plurality of foraminous egg supports arranged in superimposed relation, an egg agitating device slidably mounted across each support, handles attached to each of said devices and movable from the corresponding support, and operating mechanism for said devices connecting the said handles.

3. Storage apparatus for eggs comprising a plurality of foraminous egg supports arranged in superimposed relation, an egg agitating device slidably mounted across each support, handles attached to each of said devices and movable from the corresponding support, a vertically disposed connecting rod attached to the said handles and mounted on the exterior of the cabinet for horizontal sliding movement, and means by which said connecting rod may be operated to move the agitating means.

4. Storage apparatus for eggs comprising a plurality of foraminous egg supports arranged in superimposed relation, an egg agitating device slidably mounted across each support, handles attached to each of said devices and movable from the corresponding support, a vertically disposed connecting rod attached to the said handles and mounted on the exterior of the cabinet for horizontal sliding movement, and adjustable means connected with the opposite ends of said connecting rod whereby limited motion may be imparted to either end of said rod.

In testimony whereof we affix our signatures in presence of two witnesses.

WARD L. DRAKE.
ANNA DRAKE.

Witnesses:
GEORGE W. FISCHER,
LILLIAN KELLER.

Copies of this patent may be obtained for five cents each, by addressing the "Commissioner of Patents, Washington, D. C."